A. HUETTER.
RESILIENT TIRE.
APPLICATION FILED AUG. 9, 1916.

1,262,501. Patented Apr. 9, 1918.

WITNESSES
W. C. Fielding

INVENTOR
Andrew Huetter
BY Richard B. Owen
ATTORNEY

UNITED STATES PATENT OFFICE.

ANDREW HUETTER, OF BOONTON, NEW JERSEY.

RESILIENT TIRE.

1,262,501.   Specification of Letters Patent.   Patented Apr. 9, 1918.

Application filed August 9, 1916. Serial No. 114,047.

*To all whom it may concern:*

Be it known that I, ANDREW HUETTER, a subject of the Emperor of Germany, residing at Boonton, in the county of Morris and State of New Jersey, U. S. A., have invented certain new and useful Improvements in Resilient Tires, of which the following is a specification.

This invention relates to tires, and particularly to resilient or cushion tires.

The primary object of the invention is to provide an improved tire adapted particularly for use upon bicycles, motorcycles, automobiles, and the like, which may be used as a substitute for the now generally employed pneumatic or inflatable tire, and which will prove thoroughly efficient in absorbing shocks to which the wheel must be subjected as the vehicle travels over rough or uneven roads.

A further object of the invention is to provide improvements in tires of that character wherein improved means is provided for assembling the shock absorbing or cushioning members upon the rim in a thoroughly expedient and practical manner, which maintains the cushioning members against derangement or displacement, which prevents sand, dust, or dirt gaining access to the various cushioning members, and which will prove thoroughly practical and efficient in use.

With these objects in view, together with others which will appear as the description proceeds, the invention resides in the novel formation, combination and arrangement of parts, all as will be described more fully hereinafter, illustrated in the drawing, and particularly pointed out in the claims.

The invention will be best understood with reference to the accompanying drawings, wherein:—

Figure 1:
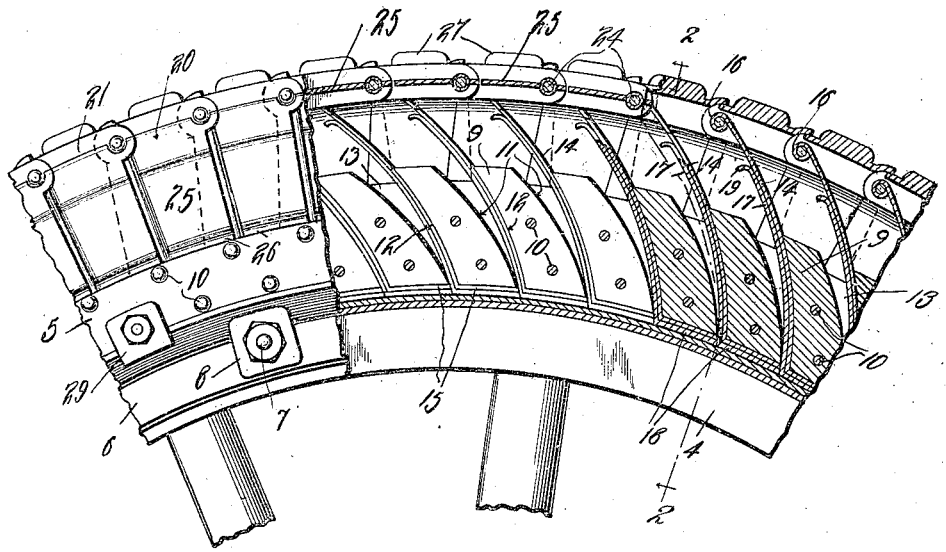
Figure 1 is a side elevation with parts in section, of a fragment of a vehicle wheel equipped with a tire constructed and arranged in accordance with the invention.

The invention contemplates broadly a tire provided with improved shock absorbing mediums, and which is capable of being readily attached to and detached from the wheel rim. The invention further resides in the provision of a demountable rim having associated therewith, a number of tread members so arranged as to be capable of being flexed as the wheel engages the ground, and which are resiliently supported by suitable springs seated within the rim member, whereby shocks to which the tread members will be subjected will be absorbed by the spring members and will not be transmitted to the vehicle axle. The invention consists in other novel details of construction to be hereinafter pointed out.

Referring now more particularly to the drawings, 4 indicates a wheel felly of the well known and generally used construction, and 5 the improved rim therefor. This rim is formed of an elongated metallic member bent in a circular formation so as to be capable of seating upon the felly and has its longitudinal edges turned upwardly to provide divergent side walls as shown. This construction provides a rim having an annular channel between the side walls thereof. This rim is retained upon the felly by means of a demountable flange or ring indicated at 6, the latter being held securely in place by bolts 7 extending laterally through the felly 4 at various points throughout its periphery. The clamping members 8, may, if desired, be associated with the bolts 7 to assist in maintaining the demountable flange upon the wheel felly. It will be understood that any preferred securing means for the demountable flange may be employed.

Arranged in circular series within the rim 5 are a plurality of blocks 9. These blocks may be formed of wood, pressed paper, pulp, fiber, asbestos, bakelite, or any other suitable material, each being of a size to rest snugly within the rim and having its lateral faces shaped to conform to the contour of the side walls of the said rim. These blocks extend preferably a trifle beyond the upper edges of the side walls 5 of the rim. Bolts 10 extend through the side walls of the rim and through the blocks 9, to maintain the latter fixed within the rim, and to lend rigidity to the side walls of the latter. Each block has its end walls curved as shown, the forward wall 11 being convex, while the rear wall 12 is concave, and the blocks are of greater length at their bases than at their outer extremities. This construction provides an annular series of pockets within the rim 5, the outer or open ends of the pockets being substantially wider than the base portions, and the said pockets are disposed rearwardly of the direction of rotation of the wheel.

The shock absorbing devices used in connection with the improved tire comprise metallic leaf springs 14. These springs are curved throughout the major portions of their length, the curvature conforming to that of the convex and concave surfaces of the various blocks. One end of each spring is bent angularly as at 15 to engage beneath its respective block, and is coiled at its outer end as at 16 as shown. The springs 14 are of such length as to project a short distance beyond the outer ends of the various rim blocks 9. A reinforcing leaf spring 17 is associated with each of the above mentioned springs, each reinforcing spring having an inwardly extending foot or base portion 18 for engagement beneath the corresponding portion of the spring 14, whereby the same may be clamped to the base portion of the rim 5. The springs 17 conform to the curvature of the spring 14, and are shorter than the latter, being bent rearwardly at their outer extremities as at 19. The springs 14 and 17 are preferably of a width equal to that of the rim 5, so as to snugly fit within the latter, but have their lateral edges curved inwardly adjacent their free ends to provide relatively restricted end portions.

The tread or ground engaging portion of the tire includes a plurality of tread members 20, each comprising a relatively narrow and short base portion, having right angularly disposed side walls 21, and providing ears 22 at the extremities of the side walls as shown. The base portion of each tread member is extended at one end as shown at 23 to overlap the adjacent end of the base of the next adjoining tread member. The ears 22 at one end of each tread member are slightly offset in an outward direction as shown, to overlap the ears of the next adjacent tread member. Bolts 24 connect the overlapping ears of the various tread members, and the coiled extremities of the springs 14 engage loosely with the bolts 24. The width of the spring members 14 at their free ends is preferably equal to the distance between the side walls 21 of the various tread members. The particular means of connecting the various tread members end to end, enables the tread of the wheel to conform to irregular roads over which the wheel must pass, and as each of the connecting bolts 24 is secured to the free end of a leaf spring 14, resiliency of the tread is assured. It is also to be observed that by overlapping the bottoms of the tread members, as well as the ends of the side walls thereof, dust, sand, and the like gaining access to the interior of the tire is prevented.

Each of the tread members has formed therewith, outwardly and oppositely projecting side plates 25. The plates 25 extend inwardly from the bottom portions of the tread members, and engage with the outer extremities of the side walls of the rim 5. The extremities of the side plates are flared outwardly as at 26 to permit of the said plates moving freely over the edges of the rim without danger of being retained by the same. This construction fully protects the interior of the tire against damage by sand and grit, and at the same time, the construction does not detract from the flexibility of the tread.

Figure 2:
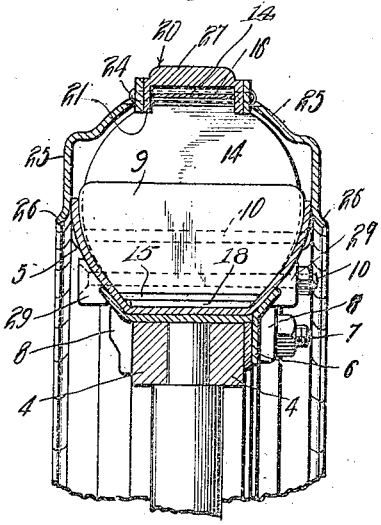
Fig. 2 is a cross sectional view taken through the wheel periphery on line 2—2 of Fig. 1.
Figure 3:
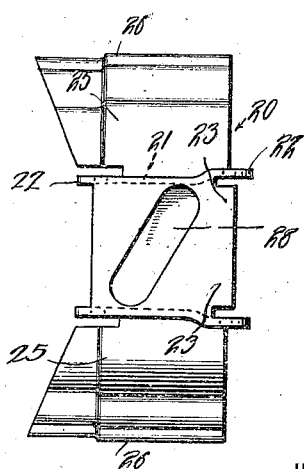
Fig. 3 is a detail plan view of a modified form of one of the tread members removed from the wheel.

It is preferred that the tread members be equipped with anti-skid devices and, as shown in Figs. 1 and 2 of the drawing, cleats 27 are formed integrally with the tread member bottoms. If desired, the tread bottoms may be apertured as shown at 28 in Fig. 3, to permit of the insertion of plugs or cleats formed of rubber, wood, rawhide composition or the like.

The tread members and their side plates may be formed of steel, aluminum, composition or alloy, or such material as will enable the same to withstand strains to which they will be subjected and which at the same time will not materially increase the weight of the wheel. Clip members 29 may be arranged upon the ends of certain of the bolts 10 to retain the rim to the demountable flanges.

From this construction, it is apparent that I have provided a tire which is capable of absorbing shocks in a thoroughly efficient manner, and which obviates the use of the now generally employed inflatable tires. It is also apparent that the compact arrangement of the blocks and springs within the tire insures the device against displacement of any of these parts. By arranging the springs substantially tangentially to the wheel rim, a number of the springs will be operated upon at the same time to support the load, whereby severe strain or fracture of the spring is obviated.

While the above is a description of the preferred embodiment of the invention, it is obvious that various changes in the minor details of construction, and arrangement of parts may be resorted to, if desired, without departing from the spirit of the invention, or exceeding the scope of the claims.

What is claimed is:—

1. In a resilient tire, a rim, a plurality of blocks carried by said rim and arranged in spaced relation around the same, said blocks having their adjacent faces curved and providing arcuate pockets between the said blocks, a leaf spring secured within each of said pockets and projecting outwardly therefrom, and a tread member carried at the free end of each spring, substantially as described.

2. In a resilient tire, a rim, a plurality of blocks carried by said rim and arranged around the same in close proximity to each other, the adjacent faces of said blocks being curved and providing pockets between the blocks having narrow bottoms and relatively wide open ends, a spring secured beneath each block and projecting through one of said pockets, tread members pivotally connected with the extremities of said springs, and the said tread members being pivoted together, substantially as described.

3. In a resilient tire, a rim, providing an annular channel, blocks arranged within said channel and providing pockets between the same, leaf springs secured within and projecting beyond the outer ends of said pockets, a tread member for each spring, each tread member comprising a base having angularly extending side walls, the extremities of the said walls of the adjacent tread members being overlapped, bolts extending through said overlapping portions and being loosely engaged by the adjacent spring ends, and side plates upon each tread member overlapping said rim, substantially as described.

In testimony whereof I affix my signature in presence of two witnesses.

ANDREW HUETTER.

Witnesses:
NELSON C. DOLAND,
FRANK LUCCIO.

Copies of this patent may be obtained for five cents each, by addressing the "Commissioner of Patents, Washington, D. C."